(12) United States Patent
Kroos (10) Patent No.: US 11,337,542 B2
(45) Date of Patent: May 24, 2022

(54) BREWING MODULE AND DRINKS PREPARATION MACHINE

(71) Applicant: Tchibo GmbH, Hamburg (DE)

(72) Inventor: Friedrich Kroos, Greifensee (CH)

(73) Assignee: TCHIBO GMBH, Hamburg (DE)

( * ) Notice: Subject to any disclaimer, the term of this patent is extended or adjusted under 35 U.S.C. 154(b) by 443 days.

(21) Appl. No.: 16/471,815

(22) PCT Filed: Dec. 20, 2017

(86) PCT No.: PCT/EP2017/083925
§ 371 (c)(1),
(2) Date: Jun. 20, 2019

(87) PCT Pub. No.: WO2018/115184
PCT Pub. Date: Jun. 28, 2018

(65) Prior Publication Data
US 2020/0093317 A1    Mar. 26, 2020

(30) Foreign Application Priority Data

Dec. 22, 2016    (EP) .................................... 16206245

(51) Int. Cl.
*A47J 31/36*    (2006.01)
*A47J 31/46*    (2006.01)
(Continued)

(52) U.S. Cl.
CPC ....... *A47J 31/3676* (2013.01); *A47J 31/3623* (2013.01); *A47J 31/4492* (2013.01);
(Continued)

(58) Field of Classification Search
CPC ................ A47J 31/3623; A47J 31/3628; A47J 31/3638; A47J 31/4492
(Continued)

(56) References Cited

U.S. PATENT DOCUMENTS 7,444,927 B1 * 11/2008 Crosville ............ A47J 31/3676
99/295
9,271,600 B2 * 3/2016 Larzul ................. A47J 31/3633
(Continued)

FOREIGN PATENT DOCUMENTS

CN    102835898    12/2012
EP    2 606 779    6/2013
(Continued)

OTHER PUBLICATIONS

English translation of International Preliminary Report on Patentability dated Jun. 25, 2019 (Jun. 25, 2019), Application No. PCT/EP2017/083925, 5 pages.

*Primary Examiner* — Reginald Alexander
(74) *Attorney, Agent, or Firm* — Rankin, Hill & Clark LLP (57) ABSTRACT

A brewing module for preparing a brewed drink from a portion capsule includes a first brewing module part and a second brewing module part which is movable relative to this between a first brewing module part position and a second brewing module part position. An operating element is further present, the operating element being able to be brought manually from a first into a second operating element position. The brewing module has an energy store which is configured, by way of moving the operating element from the first into the second position, to intermediately store energy which is coupled into the brewing module and, activated by a release, to convert it again into a movement from the first brewing module part position into the second brewing module part position.

14 Claims, 4 Drawing Sheets

(51) Int. Cl.
*A47J 31/44* (2006.01)
*A47J 31/54* (2006.01)

(52) U.S. Cl.
CPC ............ *A47J 31/468* (2018.08); *A47J 31/54* (2013.01); *A47J 31/3628* (2013.01)

(58) Field of Classification Search
USPC ............................................ 99/289 R, 302 P
See application file for complete search history.

(56) References Cited

U.S. PATENT DOCUMENTS

| | | |
|---|---|---|
| 2009/0007794 A1 | 1/2009 | Cortese |
| 2009/0308258 A1* | 12/2009 | Boussemart ........ A47J 31/3633 99/295 |
| 2010/0206177 A1 | 8/2010 | Ricotti |
| 2015/0047509 A1* | 2/2015 | Trombetta .......... A47J 31/3676 99/283 |
| 2017/0208987 A1* | 7/2017 | Zhang ................ A47J 31/3638 |
| 2018/0177331 A1* | 6/2018 | Flick .................. A47J 31/4492 |
| 2018/0360257 A1* | 12/2018 | Dionisio ................ A47J 31/38 |

FOREIGN PATENT DOCUMENTS

| | | |
|---|---|---|
| JP | 2009-542280 | 12/2009 |
| JP | 2013-533082 | 8/2013 |
| WO | 2010/118544 | 10/2010 |
| WO | 2015/039258 | 3/2015 |
| WO | 2015/048914 | 4/2015 |
| WO | 2016/087190 | 6/2016 |
| WO | 2016/091859 | 6/2016 |
| WO | 2016/091860 | 6/2016 |
| WO | 2016/091861 | 6/2016 |

* cited by examiner

BREWING MODULE AND DRINKS PREPARATION MACHINE

BACKGROUND OF THE INVENTION

Field of the Invention

The invention relates to extraction appliances for preparing drinks or the like, from an extraction material, for example ground coffee, which is contained in a portion capsule. In particular, it relates to a brewing module for an extraction appliance, to a capsule recognition module as well as to a drinks preparation machine with such a brewing module and/or capsule recognition module.

Description of Related Art

Extraction appliances for preparing drinks or the like from an extraction material, which is present in a portion packaging, are known, for example, as coffee or espresso machines. In many corresponding systems, the portion packages are designed as capsules, in which the extraction material is sealed off for example in an airtight manner. For extraction, the capsule is pierced, for example at two sides that are opposite one another. An extraction liquid—generally hot water—is then introduced at the first side. The extraction product is led out of the capsule at the second side. Such is effected in a so-called brewing module. Such a brewing module includes a brewing chamber, in which the capsule is received. Brewing modules, concerning which the capsule is inserted and the brewing chamber is closed manually by way of an operating lever or automatically in a motorised manner are particularly popular, wherein the capsule is automatically removed from the brewing chamber and ejected into a capsule container on renewed opening of the brewing chamber after the brewing procedure. Such brewing modules with an automatic capsule ejection are generally designed as horizontal brewing modules, i.e., the capsule insertion is effected from above, the closure of the brewing chamber is a horizontal relative movement of two brewing module parts, the brewing fluid flows essentially horizontally and the capsule container is formed below the brewing chamber.

In this context, one area of difficulty relates to the acquisition or detection of capsule characteristics, for example to the reading-out of information that is present on the capsule, for activating a brewing process in dependence on this information. One possibility with regard to this is to provide the capsule with a suitable marking or colour combination and to optically detect this. Such is effected for example by way of a camera. Since the brewing chamber itself on operation is too hot and is prone to contamination, the detection of the information is generally effected before the brewing process whilst the capsule is still situated outside the brewing chamber, at a capsule recognition position.

A brewing module with a capsule recognition module, concerning which, after insertion, the capsule gets into a capsule recognition position, in which the brewing module parts prevent the capsule from dropping further downwards into a brewing position, is known, for example, from WO 2016/087190. After the capsule recognition has been effected, the brewing module parts move in a motorised driven manner such that the capsule gets into the brewing position and the brewing chamber is subsequently closed. This solution permits the trouble-free separation between capsule recognition position and brewing position. However, it can only be realised with a motorised brewing module, concerning which the brewing module parts are moved towards one another and apart in a motorised manner. However, it can be advantageous for the closure to be effected manually, if, for example, a motorised drive is not desired for reasons of costs, a motorised drive is too loud or a manual drive is desired for the haptic feedback.

SUMMARY OF THE INVENTION

It is the object of the invention to provide a drinks preparation machine and a brewing module for such, which overcome the disadvantages of the state of the art and which by way of a simple as possible design permit the detection of characteristics of an applied portion capsule before the brewing process. The applied design should also be suitable for the implementation as a brewing module that is to be actuated manually.

According to the invention, a brewing module for preparing a brewed drink from a portion capsule is provided, the module including:
  a first brewing module part and a second brewing module part, which is movable relative to said first brewing module part between a first brewing module part position and a second brewing module part position, wherein, in the second brewing module part position, a brewing chamber is formed that, during a brewing procedure, at least partly surrounds the portion capsule situated in a brewing position by the first and the second brewing module part, wherein the brewing module is configured to brew a brewed drink by way of the introducing of a brewing fluid into the capsule and to discharge the brewed drink out of the capsule; and
  an operating element, which can be brought manually from a first into a second operating element position.

The brewing module is characterised by an energy store, which is configured to intermediately store energy that is coupled into the brewing module by way of moving the operating element from the first into the second position and to again convert it, activated by a release, into a movement from the first brewing module part position into the second brewing module part position.

The second brewing module part is movable, for example, relative to the first brewing module part by way of the first brewing module part being assembled in a fixed manner with respect to the housing and the second brewing module part being movable relative to the housing, in particular in a linear-translatory, in particular horizontal manner. However, a movement of both brewing module parts relative to the housing or a movement of only the first brewing module part relative to the housing is not ruled out.

The second brewing module part can be an injector, by way of which the portion capsule is pierced and from which, for example, hot water as a brewing fluid is introduced into the portion capsule. The first brewing module part can form a discharge device for leading the extraction product out of the capsule. For this purpose, it includes for example extraction-side piercing elements for the extraction-side piercing of the capsule or other structures which open the capsules at the extraction side.

In particular, the operating element can be an operating lever which can be brought from the first position into the second position by way of a top down tilting movement. In the second position, the operating lever, for example, closes a capsule insert opening, which is formed by a housing of the drinks preparation machine, for example, of the brewing module.

The movement of the operating element from the first into the second position is effected counter to a mechanical resistance, so that the user performs mechanic work, wherein the energy (minus the unavoidable losses) which is coupled into the brewing module by way of this is intermediately stored in the energy store. This store releases this energy again after the release, by way of it performing the mechanical work, which is necessary for closing the brewing chamber (for moving the second brewing module part relative to the first brewing module part into the second brewing module position).

One can optionally envisage the energy that is stored in the energy store being able to be used for moving the operating element back into the first position if no release of effected, if for example the capsule recognition was not successful or the drinks preparation machine notifies a malfunction.

In particular, the energy store can be a spring, wherein the moving of the operating element into the second position is then effected counter to the force of the spring and the spring is loaded by way of this. After the release, the spring is relaxed by way of the second brewing module part being moved relative to the first brewing module part.

Furthermore, a damping mechanism can be present, the damping mechanism preventing the second brewing module parts—which is to say the operating element—from being accelerated too greatly given the movement that is caused by the spring—and from hitting a stop too rapidly due to this. Such a damping mechanism can be formed in the energy store itself or separately therefrom.

In an example, the energy store is a gas compression spring. Such has the advantage that a damping mechanism can be integrated into the spring from the very beginning.

For moving the second brewing module part into the second brewing module part position, the energy store, for example directly or indirectly, exerts a force onto the second brewing module part in the direction of the second brewing module part position and onto the operating element in the direction of the first position. The brewing chamber closes if the energy store is filled and the second brewing module part is not blocked, and the operating element moves back in the direction of the first position when the energy store is filled and the operating element is not blocked. As mentioned, the latter can be used if the preparation procedure is to be aborted, i.e., if the capsule insert opening is to be accessible again, so that the capsule can be removed.

In particular, the brewing module can include a transmission mechanism for coupling the work executed on the operating element into the energy store, and for converting a work-performing force, from the energy store into a movement of the second brewing module part relative to the first brewing module part.

Such a transmission mechanism—it can also be considered as a type of gear—can be designed, for example, as a lever mechanism. Supplementarily or alternatively, it can also include another mechanical force or torque transmitting means, for example cogs that mesh into one another, a worm gear, etc.

In particular, the transmission mechanism can include several coupling locations. For example, the following can be provided:

The operating element engages at a first coupling location, and the force which is applied on the operating element by way of moving into the second position is transmitted to the energy store by way of the transmission mechanism and possibly loads its spring there. Given this procedure, the second brewing module part does not move.

The transmission mechanism is coupled to the energy store at a second coupling location.

The transmission mechanism is coupled at a third coupling location to the second brewing module part or to a movement mechanism for moving the second brewing module part relative to the first brewing module part (this can also include a movement of both brewing mode parts relative to the housing).

A movement of the transmission mechanism at the first and at the third coupling location can be blockable or releasable, for example in a targeted manner. Different states are possible by way of this:

in a first state, the third coupling location is blocked, which means that the second brewing module part is directly or indirectly blocked, and the first coupling location is released. In this state, the operating element and the energy store are coupled onto one another—energy can be coupled into the energy store (possibly by way of loading the spring) by way of a movement of the operating element. Conversely, the energy store can move the operating element from the second position back in the direction of the first position if no counter-force is applied.

In a second state, the first as well as the third coupling location are blocked. No movement of the transmission mechanism is possible in this stage. Energy that is present in the energy store remains stored there. This second state is assumed, for example, after operation of the operating element whilst a capsule recognition takes place and before the brewing mode is closed.

In a third state, the first coupling location is blocked, for example by way of the operating element being blocked, and the third coupling location is released. In this state, the energy store moves the second brewing module part relative to the first, possibly by way of the previously loaded spring transmitting the spring force onto the respective movement mechanism via the transmission mechanism.

In a fourth state, the first and well as the third coupling location are released. Due to a charging of the energy store (possibly loading of the spring) providing a greater mechanical resistance than a moving of the brewing module parts relative to one another, in this fourth state the operating element and the movement mechanism of the brewing module parts are de-facto coupled to one another, i.e. in the fourth state, given an empty—or blocked—energy store, the operating element can move the second brewing module part relative to the first brewing module part in a direct manner, as is always the case with drinks preparation machines according to the state of the art. The fourth state is assumed when the brewing chamber is to be opened again after the effected brewing. The opening of the brewing chamber is then effected by way of a moving of the operating element back to the first position, whereupon a capsule is inserted afresh. Energy can be coupled into the energy store afresh after assuming the first state.

In principle, it would also be possible to also design the second coupling location or the energy store in a blockable manner. However, as long as the mentioned condition is fulfilled, according to which a charging of the energy store—possibly via suitable step-up or step-down transmissions depending on the design of the transmission mechanism—requires more force than a movement of the second brewing module part relative to the first brewing module part, this is not necessary since the four mentioned states are sufficient.

If the transmission mechanism is designed as a lever mechanism, then apart from the three coupling positions, it can also include at least one fixed mounting position.

In embodiments, the transmission mechanism in particular includes a first toggle lever, wherein the energy store (for example the spring) is connected to the toggle joint of the first toggle lever. Since the force transmission changes in dependence on the state with such a mechanism, in particular it can be configured such that the force that is coupled in from the energy store is also sufficient at the end of the path when the spring is almost completely relaxed. Another rotation point (end rotation point) of the toggle lever is connected in particular to the actuation element.

If the energy store is a spring, for example a compressed air spring, then it can possibly be mounted between the toggle joint of the first toggle lever and a fixed rotation axis (mounting location).

Supplementarily or alternatively to the first toggle lever, the transmission mechanism in embodiments includes a second toggle lever that, at one of the end rotation points is connected to the second brewing module part and at the other of the end rotation points to a fixed mounting location. The drive force is coupled in via the toggle joint of the second toggle lever. By way of this, one can ensure that the force which is exerted upon the second brewing module part at the end of the closure path, towards the second brewing module part position is stepped up to a particular high extent, so that the brewing module parts can be sealingly pressed against one another with a large force.

The second end rotation point of the first toggle lever can possibly be connected to the toggle joint of the second toggle lever.

If the operating element is an operating lever, then this at the one side can be mounted at a fixed rotation point, wherein the coupling to the transmission mechanism is generally arranged remotely from the outer end of the operating lever, in order to permit a step-up transmission of the force which is applied by the user.

Apart from the elements that have been discussed, the brewing module includes, for example, a capsule recognition device. In the context of the present teaching, the capsule recognition device is assigned to the brewing module since it belongs to that part of the drinks preparation machine that receives the capsule and interacts with it, the part indeed being called the brewing module in this text. A brewing module in the context of the present text can, but does not need to be present as a separate, autonomous and exchangeable module. It can also be composed of different components that are integrated into the drinks preparation machine.

With the capsule recognition device, in particular one can firstly determine whether the inserted capsule is suitable for use in the drinks preparation machine at all or not—and this is known per se. Secondly, there exists the possibility of outputting corresponding information to the user, for example via a display, on the basis of the recognised capsule characteristics. For example, the drink type (coffee, tea, etc.), the sort (e.g., "100% Arabica"), the recommended preparation manner (e.g., "espresso", "ristretto" or "lungo" etc.) and/or other information can be displayed. Thirdly, the program, which is implemented by the coffee machine for the brewing, can be selected on the basis of the recognised capsule sort; for example the brewing pressure, the brewing duration as well as possibly also the temperature and/or other characteristics can be set depending on whether the inserted capsule is envisaged for the preparation of e.g., ristretto, espresso or lungo.

In particular, the capsule recognition device can be configured to carry out an optical capsule recognition, i.e., to read out optical features of the portion capsule via an optical sensor. For this, an illumination means, which illuminates the capsule in a controlled manner, can be present.

Suitable, optically readable features for example are a bar code, a 2D matrix code (for example QR code or Aztec code), a pictogram (icon) and/or a certain colouring. A code according to WO 2016/091859, WO 2016/091860 and/or WO 2016/091861 is also considered.

In particular, the capsule recognition device can be arranged to carry out the capsule recognition when the capsule is at a capsule recognition position, which is different from the brewing position and for example cab be above this.

In particular, in embodiments one can envisage the capsule recognition being activated by way of the moving of the operating element into its second position.

Supplementarily or alternatively, the drinks preparation machine can be configured for the effected capsule recognition to be a precondition for the enabling (release) of the movement of the second brewing module part relative to the first brewing module part into the second brewing module part position. An input by the user can possibly be demanded as a further precondition.

In these embodiments, a transport of the capsule from the capsule recognition position into the brewing position, for example by way of its dropping downwards, is effected before or during the movement of the second brewing module part relative to the first brewing module part. For this purpose, one can, for example, envisage a holding means that at least partly engages below the capsule at the capsule recognition position being retracted.

In particular, in embodiments with an optical capsule recognition device, the brewing mode can further include a mechanically driven blowing device. Such a device functions in the manner of a bellows. It can be designed as a classic bellows with a flexible membrane or, for example, as a piston system. A blowing device is coupled in particular to the transmission mechanism and is driven by this, in particular within the framework of movements, which are carried out in any case—for example on charging the energy store or on moving the second brewing module part relative to the first brewing module part.

In particular, such a blowing device is configured to produce an airflow over that transparent part of the capsule recognition device that separates the light-sensitive element of the optical sensor (in particular, such can be a camera) from the region, at which the capsule is located and through which the capsule recognition take space. This transparent part is generally a window with or without lens functions (in this context a camera lens is also indicated as a "window" if it simultaneously separates the region of the light-sensitive element from the region of the capsule). The airflow is led over the window at the capsule side, in order to counteract a fogging of the window and also in order to clean it.

At the entry side, the blowing device can be connected to a region of the drinks preparation machine, in which particularly dry and/or particularly warm air is located, in particular in the environment of the water heating means.

The invention also relates to a drinks preparation machine with a brewing module of the discussed type.

BRIEF DESCRIPTION OF THE DRAWINGS

Embodiment examples of the invention are hereinafter described by way of figures. In the figures, the same reference numerals indicate the same or analogous elements. There are shown in.

DETAILED DESCRIPTION OF THE INVENTION

The brewing module 1 according to FIGS. 1-5 includes a brewing module housing 2. Two brewing module parts, specifically a discharge device 3 and an injector 4 that are movable relative to one another, are guided in the brewing module housing 2.

The injector 4 includes perforation elements for piercing a portion capsule 10, which is at least partly filled with an extraction material—for example ground coffee. The injector 14 is configured to introduce a fluid—for example hot water—through the perforation elements or past these into the pierced capsule, wherein the water can be fed via a water feed (not shown), which can include, for example, a flexible tube.

With the embodiment example described here, the discharge device 3 also includes perforation elements, specifically extraction-side piercing tips 39. These can be designed, for example, as is described in WO 2015/039258 or in WO 2010/118544 or have another design, and the application of principles other than piercing tips, for example with grating-like structures are also possible.

The discharge device moreover includes guide means 31 which at both sides of the capsule project towards the injector side, as are described for example in WO 2015/048914, the contents of which relating to the manner of functioning of these guide means being expressly referred to here.

As is known per se, for preparing a brewed drink, a capsule is placed between the discharge device 3 and the injector 4, and these are moved towards one another such that a brewing chamber encompassing the capsule is formed between these. The hot water is fed under pressure through the injector to the capsule, and the extraction product flows through the discharge device 3 via a drinks outlet 13 into a drinks vessel, which is placed therebelow, for example.

The relative movement of the second brewing module parts (injector) relative to the first brewing module part (discharge device) in the embodiment example described here is achieved by way of the discharge device 3 being assembled in a manner in which it is fixed to the housing, whereas the injector 4 is movable along the horizontal axis.

A capsule recognition position, into which the capsules go after insertion through a capsule insert opening, is located above the brewing position, which lies between the discharge device 3 and the injector 4. Apart from the brewing chamber unit with the discharge device 3 and the injector 4, the brewing module accordingly includes a capsule recognition device 5 with a camera 5, whose construction corresponds, for example, at least partly to the construction described in WO 2016/087190.

In particular, the brewing module is configured to hold the capsule, which is inserted through the capsule insert opening in the capsule recognition position before it goes downwards into the brewing position, after the capsule recognition has been effected or possibly after a further step (for example, activation of the brewing by the user). For this purpose, for example a mechanism that includes an element that engages below the capsule at the capsule recognition position and that is retractable in an electromechanically controlled manner for the transition into the brewing position can be present. Other mechanisms that operate in a purely mechanical manner are also conceivable.

The brewing module includes an operating lever 6 for the operation by the user for the purpose of closing the brewing chamber, the operating lever being mounted at a first fixed mounting location 20 and being pivotable about this. The transmission mechanism from the operating lever 6 to the injector 4 is a lever mechanism and includes a first toggle lever and a second toggle lever. The first toggle lever is formed by a first lever arm 21, which engages on the operating lever, and by a second lever arm 22, the lever arms being pivotably connected to one another via a first toggle lever bolt 23, so that a first toggle joint forms. The second toggle lever is formed by a third lever arm 24 and a fourth lever arm 25, which are pivotably connected to one another via a second toggle lever bolt 26, so that a second toggle joint is formed. The third lever arm 24 is mounted at a second fixed mounting location 28 and is pivotable about this. The fourth lever arm 25 engages on the injector 4 and is pivotable about a bearing journal 41 of the injector 4. The injector 4 is mounted such that it is horizontally displaceable between the first brewing module part position (represented in FIG. 1) and the second brewing module part position (visible in FIG. 3).

The second lever arm 22 engages on the second toggle lever, for example by way of it being engaged with the second toggle lever bolt 26

A gas compression spring 7, which extends between a third fixed mounting location 29, about which the gas compression spring is pivotable, and the first toggle joint, engages on the first toggle joint, wherein it is engaged, for example, with the first toggle lever bolt 23.

The brewing module further includes two locking mechanisms.

A first locking mechanism is configured to prevent a movement of the second brewing module part away from the first brewing module part position. In the represented embodiment example, the first locking mechanism includes a locking bolt 81, which is displaceable in the axial direction, for example in a magnetically activated manner and which can be brought into engagement with the third and the fourth lever arm, in order to prevent a pivoting of the third and fourth lever arm relative to one another in the blocked state, which—since the third lever arm is connected to a fixed mounting location—also completely prevents a movement of the injector 4. It would alternatively also be possible to provide a locking mechanism that can be brought into engagement with the injector in a direct manner or that is configured to prevent a movement of the third or fourth lever arm relative to the housing.

A second locking mechanism is configured to block the operating lever relative to the housing 2. In the represented embodiment, the second locking mechanism functions according to the known so-called ballpoint pen principle. For this, a locking sleeve 83 is present, the locking sleeve being able to be pressed downwards by the operating lever itself against a spring force and being guided such that it is rotated about a predefined angle—for example 90°—with each pressing downwards. The rotation can be accomplished, for example, in a manner known per se by a cam groove 84 of the locking sleeve, into which groove a cam pin engages (not visible in the figures). Depending on the assumed orientation, the locking sleeve blocks a movement of the operating lever away from the second operating element position (FIG. 2 and FIG. 3) by way of locking wings 85 or releases it.

The described configuration permits the following operating sequence:

In the opened state, in which the operating lever 6 pivots upwards, at the first operating element position (FIG. 1), the capsule can be inserted through the capsule insert opening and therefore gets into the capsule recognition position.

The user subsequently actuates the operating lever 6 counter to the spring force of the gas compression spring 7 whilst the first locking mechanism blocks the second brewing module part. The operating lever gets from the first operating element position into the second operating element position. There, the operating lever is locked by the second locking mechanism.

In the represented embodiment example, the brewing module is also closed by way of bringing the operating lever into the second operating element position, whereby this can also entail the capsule at the capsule recognition position being shielded from the surrounding light.

Figure 2:
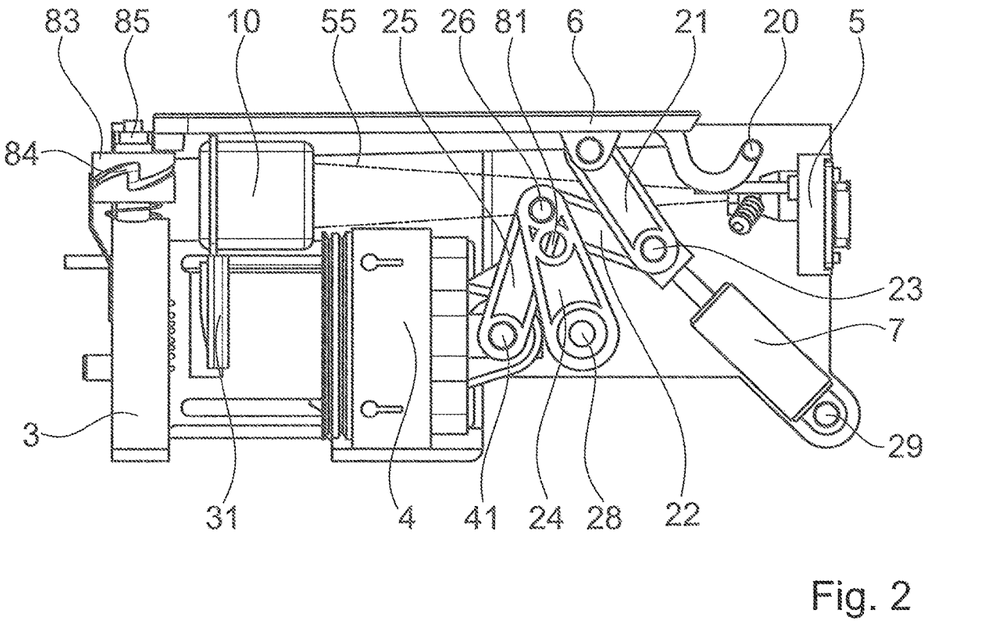
FIG. 2 a lateral view of the brewing module according to FIG. 1 during the capsule recognition.
Figure 3:
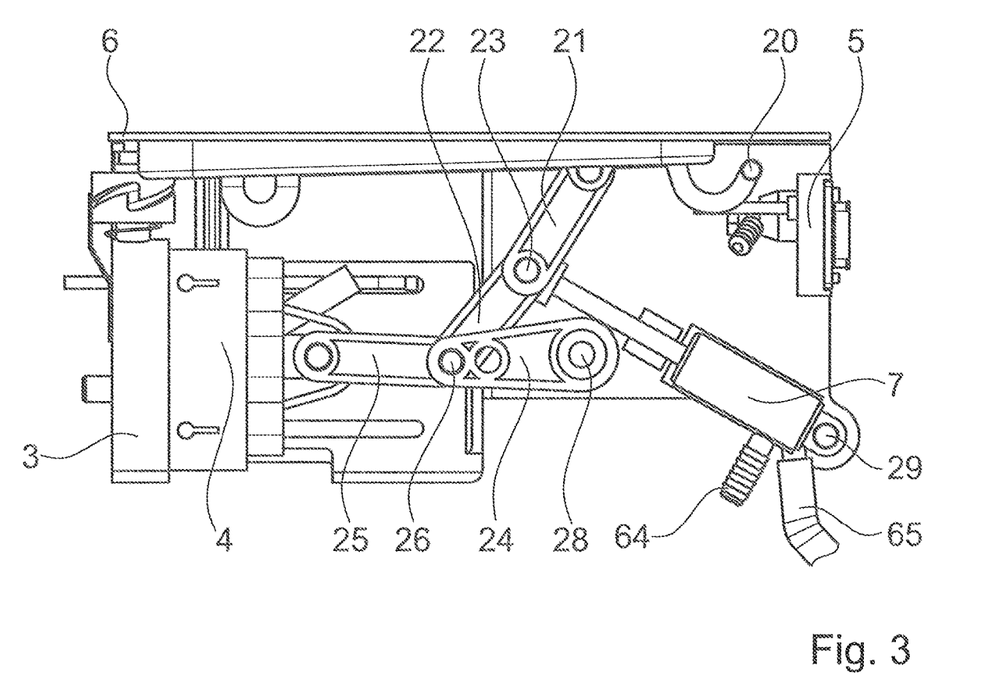
FIG. 3 a lateral view of the brewing module according to FIGS. 1 and 2 during the brewing process.
Figure 4:
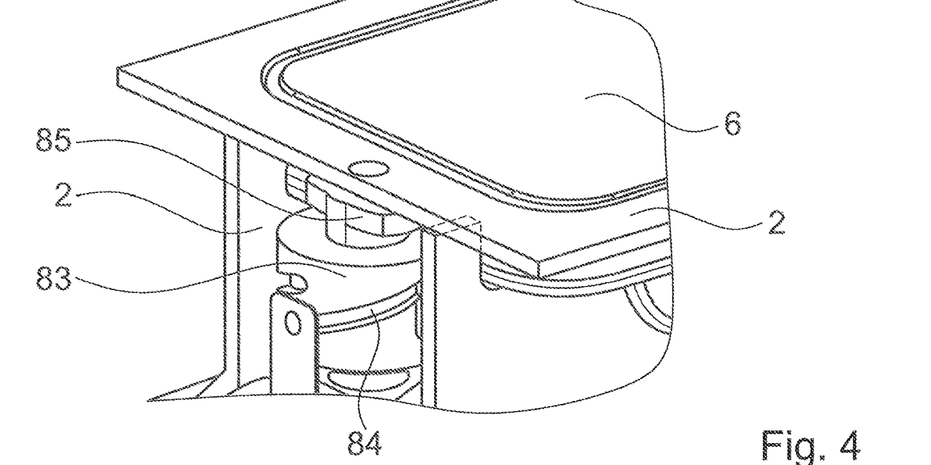
FIG. 4 a detail of the brewing module according to FIG. 1-3, the detail permitting the recognition of the second locking mechanism, FIG. 5 a detailed view of the brewing module according to FIG. 1-4, and FIG. 6 a schematic diagram of a coffee machine according to the invention.

The capsule recognition then takes place, for example, automatically without further ado by the user (a suitable sensor, for example switch, can determine that the operating lever is at the second operating lever position). FIG. 2 shows the brewing module during the capsule recognition. The capsule recognition can, for example, include the capsule 10 being illuminated—a light beam 55 is indicated in FIG. 2—and the illuminated capsule is detected by the camera, whereupon a code on the capsule or a colouring or the like is evaluated.

Activated by the successful capsule recognition or by an action of the user, a downwards movement of the capsule is subsequently effected and the brewing chamber is closed. For this, the blocking by the first locking mechanism is lifted, for example by way of an electromagnet which axially displaces the locking bolt 81 and thus releases it from the engagement with the third lever arm 24. The first toggle joint and, consequently, also the second toggle joint is elongated due to the spring force that is exerted by the gas compression spring, and this moves the injector 4 and closes the brewing chamber whilst the capsule is located therein.

The brewing process can then be effected in a manner known per se by way of hot water being introduced under pressure into the capsule, which is pierced on closure of the brewing chamber, and the arising brewed drink being discharged out of the discharge device via this device.

After the brewing has been effected, the blocking by way of the second locking mechanism is lifted again by way of the user pressing the operating lever slightly downwards, whereupon the user can pull the operating lever upwards.

Figure 1:
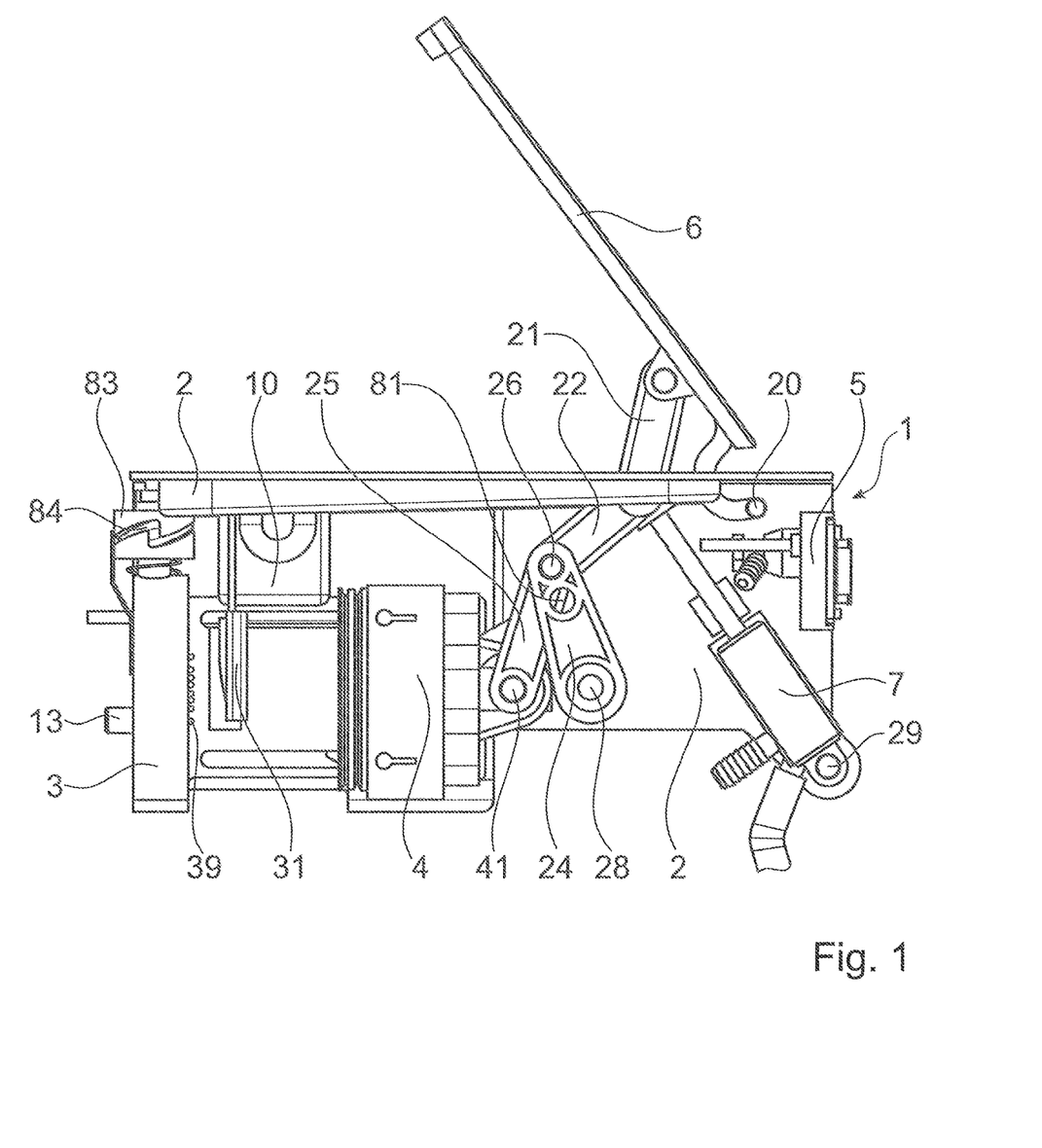
FIG. 1 a lateral view of a brewing module, wherein some parts, in particular housing parts have been omitted.

The second toggle lever is also flexed (bent) and brought into the position represented in FIG. 1 on account of the stiffness of the gas compression spring, whereupon the first locking mechanism can lock the second toggle lever. One can also effect the dropping downwards of the spent capsule into a capsule container by way of the opening. A corresponding mechanism is described, for example, in WO 2015/048914.

If, instead of bringing the capsule into the brewing position and closing the brewing chamber, the user wishes to remove it—for example if, on account of the capsule recognition, it has been ascertained that the selected capsule is not suited to the desired drink—then the user by way of pressing the operating lever downwards can lift the blocking by way of the second locking mechanism. The gas compression spring subsequently presses the operating lever upwards again, and the user can remove the capsule from the capsule recognition position.

Figure 5:
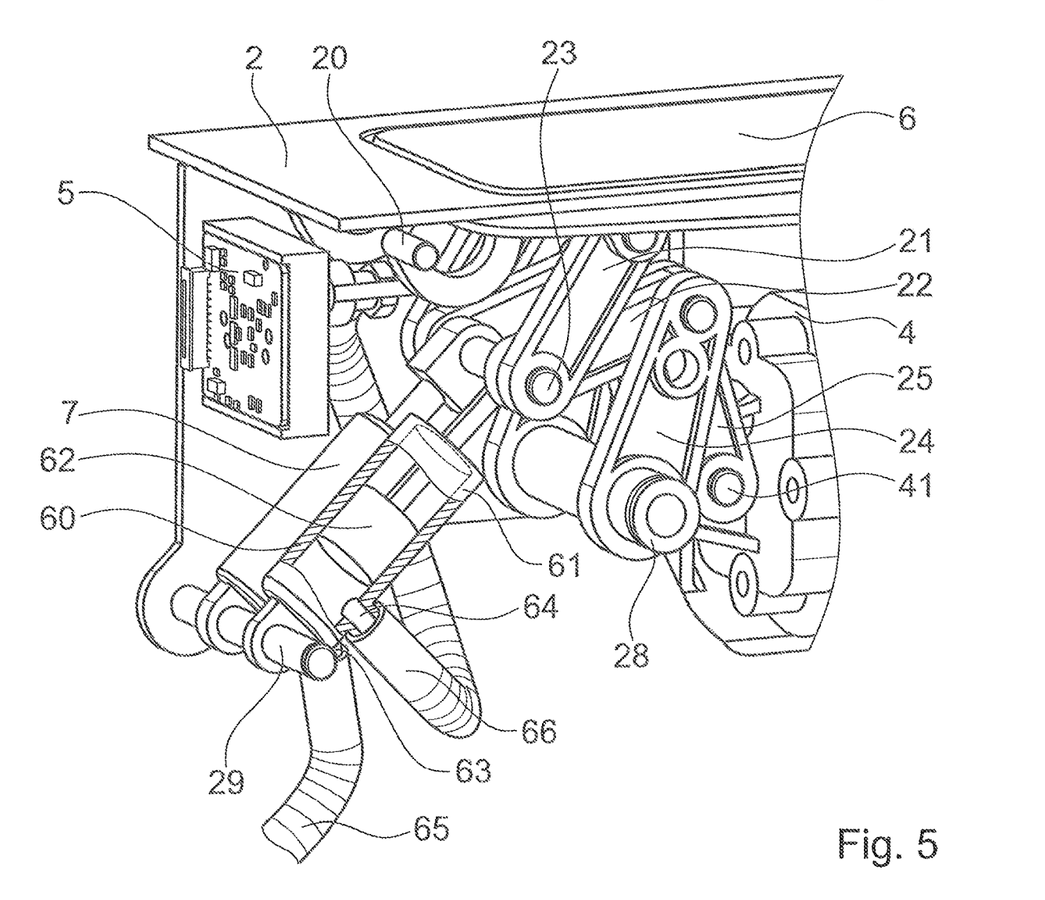

A further feature is particularly well visible in FIG. 5. Apart from the aforementioned elements, a blowing device 60—corresponding functionally to a bellows—is also connected to the lever mechanism. This blowing device here includes a cylinder 61 and a piston 62 that is displaceable in the cylinder. The cylinder 61 is pivotably mounted at the third fixed mounting location 29, whilst the piston 62 is connected to the first toggle lever bolt via a conrod, so that the piston 62 is also moved in the cylinder on loading or relaxing the gas compression spring. An active volume which is enlarged or reduced by way of the displacement of the piston 62 in the cylinder forms below the piston 62 in the represented orientation, in FIG. 5 to the left below the piston.

Two air connections 63, 64 run out into the active volume of the cylinder 61.

A first air connection 63 is connected to an air suction tube 65, through which air can be sucked. The tube leads, for example, to a location within or outside the drinks preparation machine housing, at which location one is to reckon with the presence of particularly dry and/or particularly warm air. In an embodiment example, the air suction tube leads to a location next to the water heating means, where a slightly increased temperature prevails due to the arising waste heat and air is therefore preheated.

A connection tube 66 is connected onto a second air connection 64, the connection tube leading to a region of the capsule recognition device 5 which, towards the capsule recognition position, is directly adjacent to a lens or a window, which is arranged between the camera sensor (for example with a CCD or CMOS sensor array) and the capsule recognition position and, for example, prevents hot vapours from getting out of the brewing chamber to the camera sensor.

The first and the second air connection 62, 63 and/or the respective tubes 65, 66, which are connected thereto are each provided with a valve means—for example a simple valve, as is used in principle for inflating air balloons—which have the effect of air only being able to be sucked but not being able to be blown out through the first air connection and conversely air only being able to be blown out but not sucked through the second air connection.

The blowing device 60 is arranged parallel to the compressed air spring 7. By way of this, the air present in the cylinder 61 is blown through the connection tube in front of the lens or the window on loading the compressed air spring 7 by way of actuating the operating lever 6, by which means a possible fogging or a contamination is removed and/or a fogging/contamination is prevented. The piston is moved back again on relaxing the compressed gas spring on closing the brewing chamber, by which means air is sucked.

A mechanically driven blowing device of the described type can also be arranged at a location other than the described one in the brewing module and can be actuated by way of relative movements of elements, for example parallel to the first toggle lever or possibly to the second toggle lever or between the brewing module housing and the injector. An arrangement that, as in the described embodiment example, permits an airflow to the capsule recognition device directly in front of the capsule recognition is particularly advantageous.

In FIG. 5, one can also see that in the present embodiment example, each lever arm is constructed of two lever arm elements that are arranged symmetrically to a vertical middle plane, which however is not a necessity. The rotation points, which are described in this text, are accordingly designed as rotation axes or contain two rotation points that are aligned to one another, symmetrically to the vertical middle plane.

Figure 6:
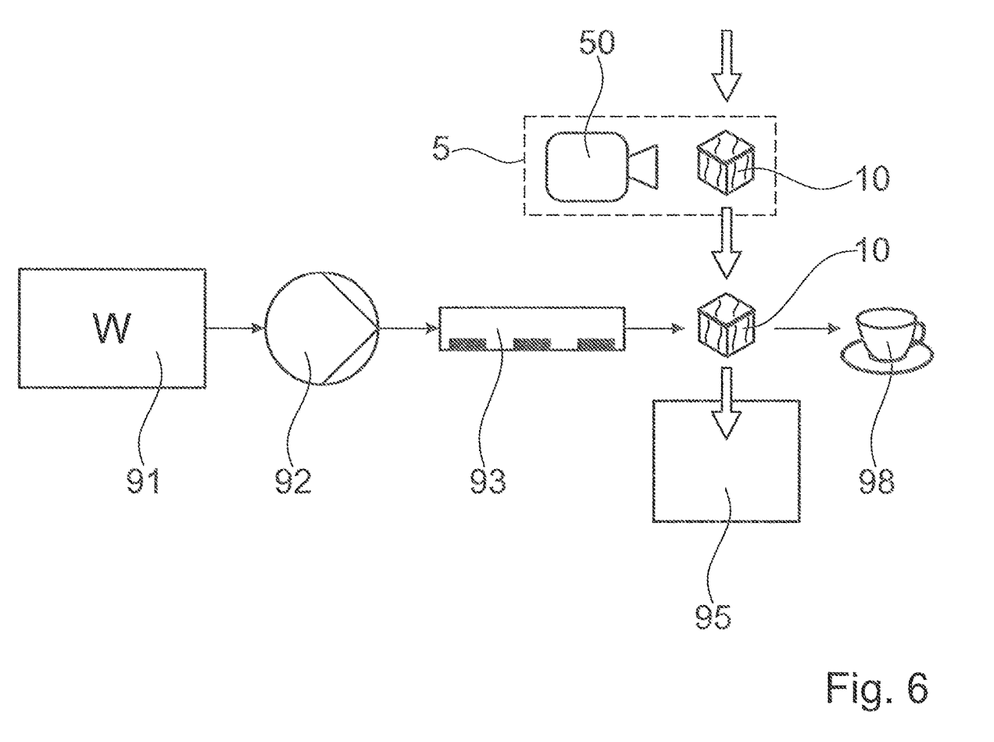

A machine according to the invention, for preparing a brewed drink from a portion capsule 10, here specifically a coffee machine, with a brewing module is schematically represented in FIG. 6. Apart from the brewing module, it includes a water tank 91, a pump 92 for feeding brewing water to the injector 4 and a water heating device 3 (for example, a continuous heater). The capsule recognition module 5 with the camera 50 is located in particular above the brewing chamber. After the capsule recognition process, an inserted capsule, as described beforehand, can be transported further downwards by way of the effect of gravity. Furthermore, a capsule container 95, into which the capsules 1 drop or are transported after the brewing process, is arranged below the brewing module. The reference numeral 98 indicates a coffee cup.

LIST OF REFERENCE NUMERALS 1 brewing module
2 brewing module housing
3 discharge device
4 injector
5 capsule recognition device
6 operating lever
7 compressed gas spring
10 portion capsule
13 drinks run-out
20 first fixed mounting location
21 first lever arm
22 second lever arm
23 first toggle lever bolt
24 third lever arm
25 fourth lever arm
26 second toggle lever bolt
28 second fixed mounting location
29 third fixed mounting location
31 guide means
39 extraction-side piercing tips
41 bearing journal
50 camera
55 light beam
60 blowing device
61 cylinder
62 piston
63 first air connection
64 second air connection
65 air suction tube
66 connection tube
81 locking bolt
83 locking sleeve
84 cam groove
85 locking wing
91 water tank
92 pump
93 water heating device
95 capsule container
98 coffee cup

The invention claimed is:

1. A brewing module for preparing a brewed drink from a portion capsule, comprising:
   a first brewing module part and a second brewing module part, the second brewing module part being movable relative to said first brewing module part between a first brewing module part position and a second brewing module part position, wherein, in the second brewing module part position, a brewing chamber is formed which during a brewing procedure at least partly surrounds the portion capsule situated in a brewing position, wherein the brewing module is configured to brew a brewed drink by way of introducing a brewing fluid into the portion capsule and to discharge said brewed drink out of the portion capsule;
   an operating element that can be brought manually from a first into a second operating element position;
   an energy store, which is configured to intermediately store energy that is coupled into the brewing module, by way of moving the operating element from the first into the second position, and to again convert it, activated by a release, into a movement from the first brewing module part position into the second brewing module part position; and
   a transmission mechanism for coupling the physical work executed on the operating element into the energy store, and for converting a work-executing force from the energy store into the movement of the second brewing module part relative to the first brewing module part;
   wherein the transmission mechanism is designed as a lever mechanism and comprises a plurality of levers which are pivotable relative to one another; and
   wherein the transmission mechanism comprises a first toggle lever which at one of the end rotation points is connected to the second brewing module part and at the other of the end rotation points to a fixed mounting location, wherein, via a toggle joint of the first toggle lever, a drive force for the movement from the first brewing module part position into the second brewing module part position can be coupled in.

2. The brewing module according to claim 1, wherein the operating element is an operating lever which can be brought from the first into the second position by way of a top down tilting movement and wherein the operating element in the second position closes a capsule insert opening.

3. The brewing module according to claim 1, wherein the energy store comprises a spring which is loaded by way of the moving of the operating element from the first into the second position.

4. The brewing module according to claim 1, further comprising a damping mechanism which acts in a damping manner on movement from the first brewing module part position into the second brewing module part position.

5. The brewing module according to claim 4, wherein the energy store is a gas compression spring, into which the damping mechanism is integrated.

6. The brewing module according to claim 1, wherein the transmission mechanism comprises a second toggle lever, wherein the energy store is connected to a toggle joint of the second toggle lever and an end rotation point of the second toggle lever is connected to the actuation element.

7. The brewing module according to claim 1, further comprising a mechanically drivable blowing device which is arranged to be driven by the transmission mechanism.

8. The brewing module according to claim 1, further comprising a locking mechanism which is configured to prevent or release a movement of the second brewing module part away from the first brewing module part position, depending on its state.

9. The brewing module according to claim 1, further comprising a locking mechanism which is configured to prevent or release a movement of the operating element away from the second operating element position, depending on its state.

10. The brewing module according to claim 1, further comprising a capsule recognition device which is configured to electronically detect characteristics of a portion capsule which is located at a capsule recognition position.

11. The brewing module according to claim 10, wherein the capsule recognition position is above the brewing position.

12. A drinks preparation machine comprising a water feed, a pump and a water heater as well as a brewing module according to claim 1.

13. A brewing module for preparing a brewed drink from a portion capsule, comprising:
   a first brewing module part and a second brewing module part, the second brewing module part being movable relative to said first brewing module part between a first brewing module part position and a second brewing module part position, wherein, in the second brewing module part position, a brewing chamber is formed which during a brewing procedure at least partly surrounds the portion capsule situated in a brewing position, wherein the brewing module is configured to brew a brewed drink by way of introducing a brewing fluid into the portion capsule and to discharge said brewed drink out of the portion capsule;
   an operating element that can be brought manually from a first into a second operating element position;
   an energy store, which is configured to intermediately store energy that is coupled into the brewing module, by way of moving the operating element from the first into the second position, and to again convert it, activated by a release, into a movement from the first brewing module part position into the second brewing module part position; and
   a damping mechanism which acts in a damping manner on movement from the first brewing module part position into the second brewing module part position;
   wherein the energy store is a gas compression spring, into which the damping mechanism is integrated.

14. A brewing module for preparing a brewed drink from a portion capsule, comprising:
   a first brewing module part and a second brewing module part, the second brewing module part being movable relative to said first brewing module part between a first brewing module part position and a second brewing module part position, wherein, in the second brewing module part position, a brewing chamber is formed which during a brewing procedure at least partly surrounds the portion capsule situated in a brewing position, wherein the brewing module is configured to brew a brewed drink by way of introducing a brewing fluid into the portion capsule and to discharge said brewed drink out of the portion capsule;
   an operating element that can be brought manually from a first into a second operating element position;
   an energy store, which is configured to intermediately store energy that is coupled into the brewing module, by way of moving the operating element from the first into the second position, and to again convert it, activated by a release, into a movement from the first brewing module part position into the second brewing module part position;
   a transmission mechanism for coupling the physical work executed on the operating element into the energy store, and for converting a work-executing force from the energy store into the movement of the second brewing module part relative to the first brewing module part; and
   a mechanically drivable blowing device which is arranged to be driven by the transmission mechanism.

* * * * *